United States Patent
Kolb

[15] 3,677,090
[45] July 18, 1972

[54] PRESSURE MEASURING DEVICE

[72] Inventor: Dieter Kolb, Sutttgart-Degerloch, Germany

[73] Assignee: Lestra AG, Glarus, Switzerland

[22] Filed: March 31, 1971

[21] Appl. No.: 129,817

[30] Foreign Application Priority Data

Oct. 12, 1970   Germany ....................... P 20 49 998.3

[52] U.S. Cl. ................................. 73/420, 73/115
[51] Int. Cl. ............................................. G01l 7/00
[58] Field of Search ................... 73/420, 388, 115

[56] References Cited

UNITED STATES PATENTS 3,326,046   6/1967   Risher .................................. 73/420 X

*Primary Examiner*—Donald O. Woodiel
*Attorney*—Spencer & Kaye

[57] ABSTRACT

Apparatus for measuring and/or controlling pressures appearing in succession at the same measuring point has a cylinder arranged at a measuring point and defining a chamber. A piston defining a plurality of control passages is arranged in the cylinder chamber so as to be moved by successive pressures appearing at the measuring point. A measuring line is associated with each of the control passages defined in the piston. Means are provided for imparting a rotary control movement to the piston by means of the successive pressures and for consecutively connecting the measuring lines to the measuring point through at least one of the plurality of control passages defined in the piston. The control movement imparting means may be a guide pin cooperating with a circumferential guide groove defined in the piston, or it may be two pairs of cooperating crown gears.

12 Claims, 4 Drawing Figures

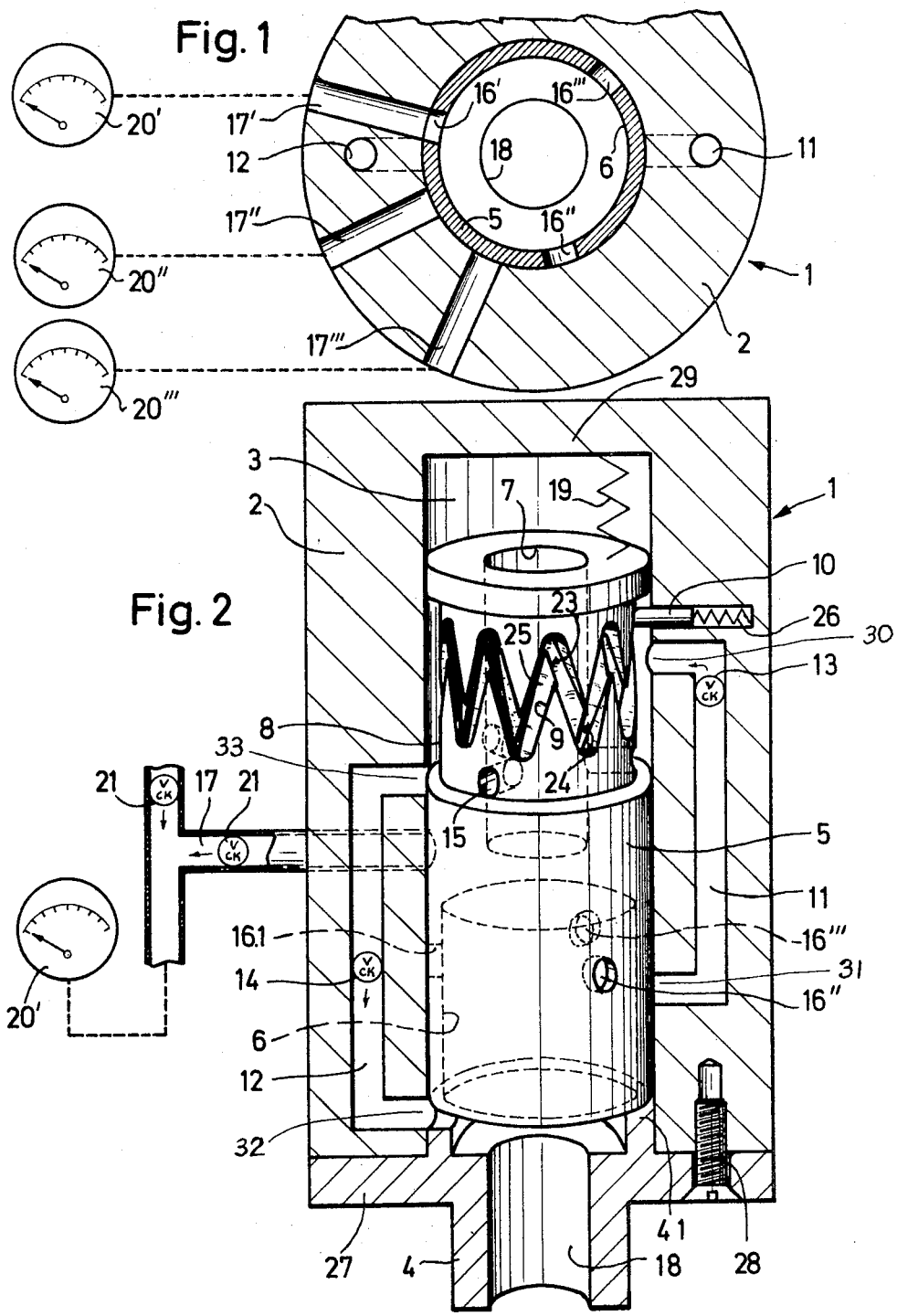

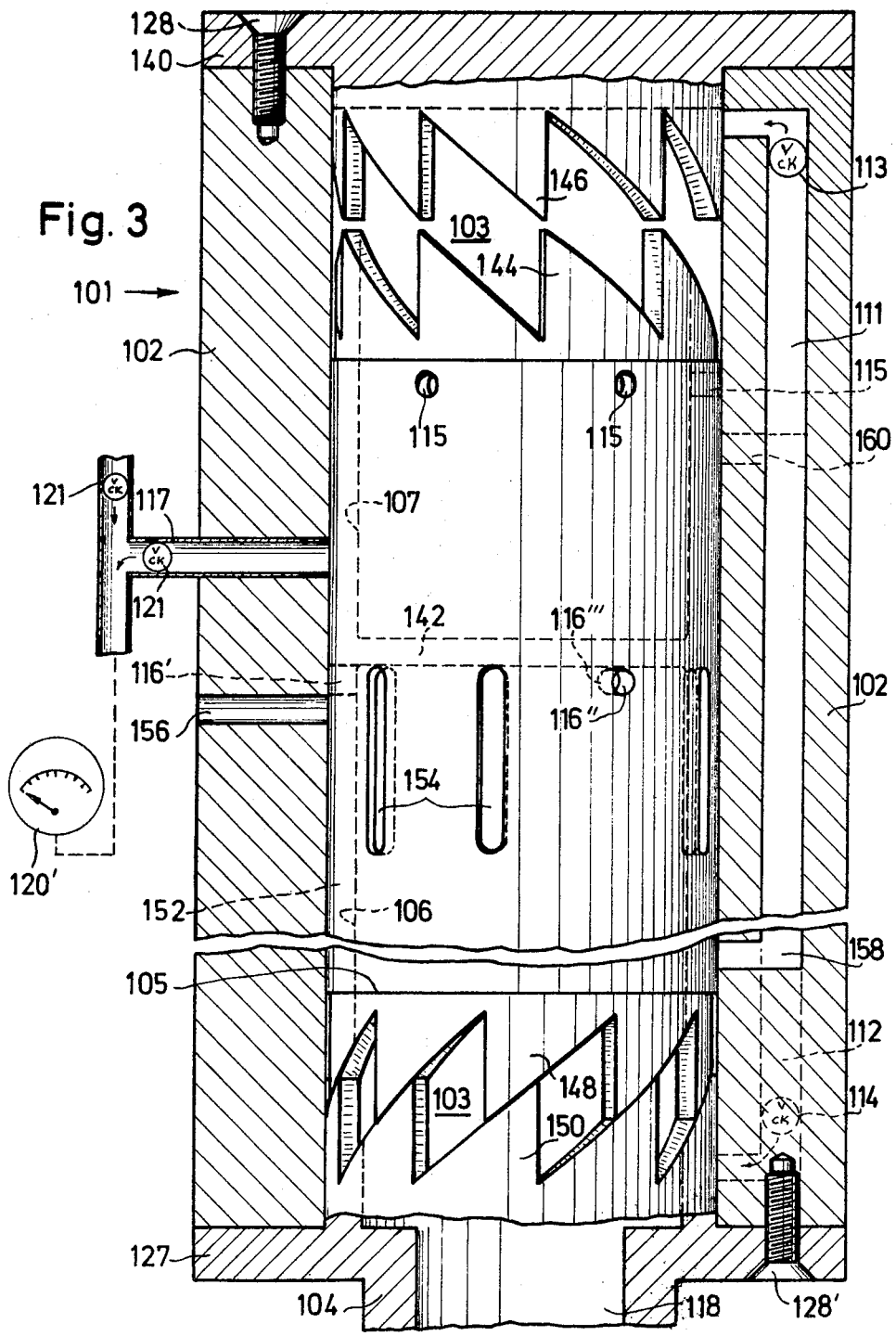

PRESSURE MEASURING DEVICE

BACKGROUND OF THE INVENTION

The present invention relates to a device for measuring and/or controlling pressures which appear in succession at the same measuring point and are passed through measuring lines to measuring and/or regulating devices.

The present invention first of all serves the purpose of measuring the compression pressures in the combustion chambers of engines commonly known as rotary internal combustion engines or revolving piston internal combustion engines (Wankel engine). The known measuring instruments intended for measuring compression pressures in engines with reciprocating pistons are not suited for this purpose since they are able to measure only the compression pressure of a single cylinder at one and the same measuring point, see for example the British Pat. Nos. 741,043 and 781,755.

SUMMARY OF THE INVENTION

It is an object of the present invention to provide a device with which it is possible to measure pressures, and possibly regulate them, at one and the same measuring point in, for example, the housing of a revolving piston internal combustion engine.

This is accomplished according to the present invention by arranging a piston in a cylinder disposed at the measuring point. This piston can be moved by the pressure to be measured and is provided with a plurality of control passages. Further, the piston experiences a regulating movement under the influence of the successively occurring pressures, so that it consecutively connects the measuring lines for carrying the individual pressures to the measuring point through at least one of the control passages.

The idea of the present invention is, thus, to simultaneously utilize the pressure being measured to actuate a piston acting as a control pusher, so that the appropriate displacement of the pusher feeds the presently available pressure to a predetermined measuring line and, thus, to a predetermined measuring or regulating device. The present invention displays its advantages particularly when the successive pressures to be measured appear periodically in rapid succession, as is the case with, for example, rotary combustion engines.

In a first preferred embodiment of the present invention, it is proposed that the piston define a guide groove which cooperates with a guide pin to impart a rotary movement to the piston during its reciprocating movement in the cylinder, so that the individual measuring lines are consecutively connected to the measuring point. The present invention also considers utilizing a control movement produced by the pressure being measured not only for the consecutive measurement or control of individual pressures, but also quite generally to utilize the rotation of the piston stroke during its back and forth movement as a control pusher for any other desired control purposes, as actuating switches, etc.

In the first preferred embodiment of the present invention, the guide pin is resiliently mounted and a zigzag-shaped guide groove is provided which has short, sharp turns with step-like sections to permit rotation of the piston only in one direction.

In this preferred embodiment of the present invention, the piston may be provided with recesses to reduce its mass. The return of the piston may be accomplished by control channels in the cylinder wall and/or by spring pressure.

It is, moreover, of advantage if the measuring lines are provided with check valves.

Another preferred embodiment of the present invention provides teeth disposed at the ends of the piston to alternatingly mesh with an upper and a lower group of teeth disposed in the cylinder as a result of the axial displacement of the piston within the cylinder.

It is of advantage in this embodiment if the teeth in the piston and in the cylinder are formed as crown gears.

In the preferred embodiment of the invention the meshing teeth are so aligned that a reciprocating movement of the piston causes the piston to be turned about its axis by an angle of 40°.

It is, moreover, favorable if the control passages provided in a jacket of the piston are offset with respect to one another at an angle of 120°.

A further feature of the second embodiment of the present invention is that two grooves which are in communication with the ventilation apertures provided in the cylinder are worked into the wall of the piston at the same angular spacing as between the control passages.

BRIEF DESCRIPTION OF THE DRAWINGS

FIG. 1 is a partly schematic, top plan, cross-sectional view of a first embodiment of the present invention.

FIG. 2 is a partly schematic, side elevational, cross-sectional view of the embodiment of FIG. 1.

FIG. 3 is a partly schematic, side elevational, cross-sectional view of a second embodiment of the invention.

DESCRIPTION OF THE PREFERRED EMBODIMENTS

Figure 4:
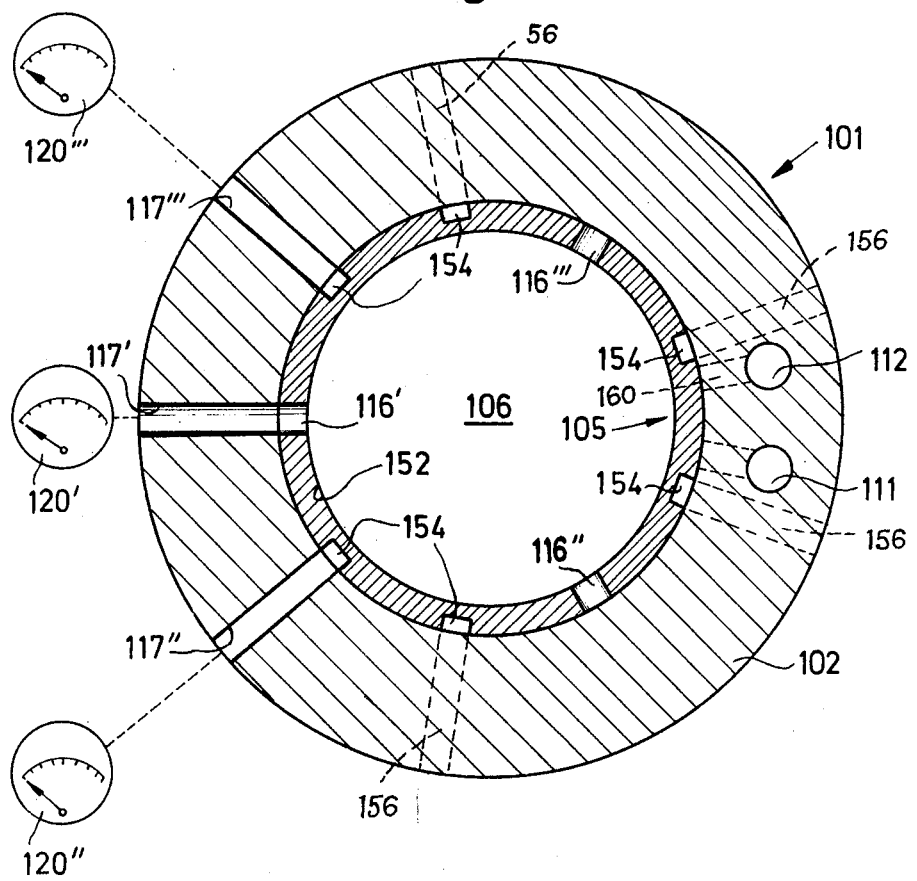
FIG. 4 is a partly schematic, top plan, cross-sectional view of the embodiment of FIG. 3.

The preferred embodiment of the device according to the present invention as shown in FIGS. 1 and 2 of the drawings has a cylinder 1 whose wall 2 defines a cylindrical chamber 3 which is closed on one side by an end wall 29. The chamber 3 opens into an adaptor member 4 at the end of cylinder 1 opposite the wall 29. Member 4 connects cylinder 1 to the measuring point in such a manner that the successive pressures at the measuring point can be conducted into the chamber 3 through a bore 18 defined in the member 4. In particular, the member 4 may be fastened to the housing of a revolving piston internal combustion engine in such a way that the respective compression pressure from each combustion chamber formed at the measuring point is propagated to the chamber 3.

A piston 5 is in an airtight manner fitted in chamber 3 so that it can slide up and down. The piston 5, which may be a suitable, known metal or synthetic, defines a bore 6 opening toward the member 4. On the end of piston 5 which is facing away from member 4 a bore 7 is defined which is not in communication with bore 6 and which opens into the section of chamber 3 disposed above piston 5. Bores 6 and 7 serve to reduce the mass of piston 5.

A relatively wide annular groove 8 which extends over the entire periphery of the piston 5 is disposed at the upper portion of piston 5, and a, for example, closed, zigzag-shaped guide groove 9 is worked into its inner radial surface. At the short, sharp turns of the guide groove 9, step-shaped portions 23, 24 are provided between which the bottom surface 25 of the groove 9 ascends obliquely. Instead of a zigzag-shaped groove 9, it is also possible to provide a groove which has the shape of a closed, continuously bent curve (not shown). A guide pin 10 engages in the guide groove 9. Pin 10 is held in a suitable bore formed in cylinder wall 2 so as to be slidably displaceable therein, and is pressed resiliently into groove 9 by a spring 26. In the case of a guide groove without steps, pin 10 may also be rigidly fastened to wall 2. The guide groove 9 and guide pin 10 may also be arranged at the lower portion of the piston; for example, at the level of bore 6.

Reversing channels 11 and 12 are formed in cylinder wall 2, and their openings leading into chamber 3 are axially offset with respect to one another as illustrated in FIG. 2. A suitable, known check valve 13 is disposed in channel 11 and is arranged to open in response to a pressure acting from the bottom to the top in FIG. 2. A suitable, known check valve 14 is disposed in channel 12 and is arranged to open in a flow direction which is opposite the opening direction of valve 13.

In the rest or starting position of piston 5 shown in FIG. 2, piston 5 rests on an inwardly extending part 41 of member 4. Part 41 is designed to act as abutment. Member 4 and abutment 41 may be molded to a plate 27, which is held at the cylinder 1 by means of, for example, screw fasteners 28. Only one screw fastener 28 is shown in FIG. 2. When piston 5 is displaced into its end position which is opposite the rest position, it abuts the wall 29 of cylinder 1.

Within the annular groove 8, the peripheral surface of piston 5 is interrupted by one or more holes 15. In the lower portion of the piston 5, control passages 16', 16'', 16''' are provided and are arranged to connect bore 6 with the outside of piston 5. Moreover, the cylinder wall 2—see, in particular, FIG. 1—is traversed by one or more measuring lines 17', 17'', 17''' whose openings into chamber 3 are so arranged that they coincide at least with one of the passages 16', 16'', 16''' in the piston 5 when the piston 5 is moved upwardly from the position shown in FIG. 2. The measuring lines 17', 17'', 17''' are connected to pressure gauges and/or control devices 20', 20'' or 20''', respectively. Instead of a plurality of measuring or control devices, it is also possible to use a single device which can be switched in a known manner not shown to the individual measuring lines 17'-17''. The measuring lines 17'-17''' can be provided with suitable, known check valves 21. The measuring lines, which in the illustrated embodiment are brought radially out of cylinder 1, may, of course, leave the cylinder in other directions: for example, axially. It is to be understood that the number of measuring lines may vary, depending on the number of pressures to be measured.

During operation of the device shown in FIGS. 1 and 2, the member 4 is connected with the measuring point in a known, pressure-tight manner. The measuring point may be provided at, for example, the housing of a revolving piston engine. The pressure at the measuring point—in the case of a revolving piston engine, the compression pressure of the combustion chambers passing by the measuring point—then enters into chamber 3, as well as bore 6, and lifts piston 5 to such an extent that one of the control passages 16'-16'''—for example, passage 16'— coincides with the inlet opening of a measuring line 17'-17'''—for example measuring line 17'—so that the pressure from bore 6 can pass through measuring line 17 and reach measuring instrument 20'.

Shortly before the piston 5 abuts the wall 29 of the cylinder 1, the lower edge of piston 5 unblocks the opening 31 of channel 11. Thus, the pressure to be measured travels through channel 11 and the check valve 13 into the upper portion of chamber 3, so that a pressure is produced in groove 8 and by the holes 15 on the upper surfaces of the piston which tends to press the piston 5 back into its rest position. When the pressure on the lower surfaces of piston 5 is removed, check valve 13 closes and piston 5 is returned to its rest position by the pressure in the upper portion of chamber 3.

Shortly before the piston 5 reaches the rest position the opening 33 of channel 12 is unblocked, so that the pressure in the upper portion of the chamber 3 can escape through channel 12, check valve 14, and bore 18 to reach the chamber being measured.

With each raising and lowering of the pressure to be measured, piston 5 is raised and lowered in the manner described above. At the same time, a rotary movement is imparted to piston 5 because of the guide pin 10 elastically engaging into guide groove 9. This rotary movement covers a precisely predetermined portion of the circumference of piston 5. With suitable design of the guide groove 9, the rotary movement of piston 5 may be controlled in such a manner that consecutive upward strokes of the piston 5' bores 16'-16''' permit the pressure to reach the individual measuring lines 17'-17'''. In the embodiment of FIGS. 1 and 2, the guide pin 10 slides under the bias of spring 26 on the obliquely ascending bottom surface 25 of a straight portion of the guide groove 9 until it reaches a step-shaped portion 23, 24 at the reversal point and is then pressed down into the following straight portion of the guide groove 9. In this manner, it is accomplished that the rotary movement of the piston can occur only in one direction.

The phase of the control movement of piston 5 is so adjusted that, even for a plurality of revolutions of piston 5, a certain pressure from, for example, a certain combustion chamber of a revolving piston engine, travels through the same measuring line to the same measuring or control instrument.

In the embodiment of FIGS. 1 and 2, the return of the piston 5 occurs by means of channels 11, 12 having check valves 13, 14, respectively, provided therein. Instead of, or in addition to, channels 11, 12, a return spring 19, with further control valves if required, may also be provided to return the piston. The arrangement and function of such further control valves is known per se in the art.

The modified embodiment of the present invention which will now be described is particularly simple in construction and, thus, particularly economical in operation.

FIG. 3 shows a second preferred embodiment of the device according to the present invention. A cylinder 101 has a wall 102 defining a chamber 103.

A circular plate 140 is arranged at the end of cylinder 101 which is at the top in FIG. 3 and functions to seal chamber 103 from the atmosphere. The airtight connection between plate 140 and cylinder 101 is achieved by, for example, screw fasteners 128. Only one screw fastener 128 is shown in FIG. 3.

At the lower end of cylinder 101 (FIG. 3) there is also a plate 127 fastened to cylinder 101 by means of screw fasteners 128'. Only one screw fastener 128' is shown in FIG. 3. Plate 127 is provided with an adaptor member 104 in whose interior a bore 118 is defined. The device is fastened to a measuring point by member 104 in such a way that the pressures there encountered are introduced into chamber 103 through bore 118.

Chamber 103 serves to hold and guide an airtightly fitted piston 105 which can slide up and down in chamber 103 during operation of the device. Piston 105, as can be seen particularly well in FIG. 4, is also cylindrical and has an upwardly opening bore 107 in its upper section, while a downwardly opening bore 106 is in communication with the bore 118 of the adaptor member 104. The two bores 106, 107 are separated from one another by a partition 142, as shown in FIG. 3.

A crown gear 144 is provided at the upper end of piston 105. During the upward movement of piston 105, this crown gear 144 comes into engagement with a crown gear 146 which is firmly attached to plate 140. At the lower end of piston 105 there is arranged a crown gear 148 which, however, differs from crown gear 144 in that the upper crown gear 144, as seen in FIG. 3, is constructed to have teeth directed upward and toward the left, whereas the lower crown gear 148 has teeth directed downward and toward the left. The teeth of gear 144 are, moreover, offset with respect to teeth 148 by, for example, 10°. Crown gear 148 meshes with a further crown gear 150 attached to plate 127 during the downward movement of piston 105.

The teeth of each crown gear 144, 146, 148 and 150 have approximately the shape of a right triangle, as can be seen in FIG. 3, whose 90° angle is defined by the root line of the gear and whose hypotenuse is an obliquely ascending tooth edge. The tooth division and the inclination of the tooth edge are so dimensioned that with each engagement of the two gears 144, 146 or 148, 150, respectively, the piston 105, which is slidably and rotatably disposed in chamber 103, is rotated by an angle of 20°. As a result, an up and down movement of the piston 105 rotates the piston 40°, since in this case the upper gears 144, 146 become effective once and then the lower gears 148, 150.

The piston wall 152 is penetrated by three control passages 116', 116'' and 116''' in the region of the bore 106. The passages are located about the circumference of piston 152 at a mutual angular spacing of 120°, as can best be seen in FIG. 4.

Corresponding with the three control passages 116', 116'' and 116''', are three measuring lines 117', 117'' and 117''' (FIG. 4) formed in the wall 102 of cylinder 101 (FIG. 4). The three measuring lines are offset by 40° with respect to one another, as can best be seen in FIG. 4. Since a reciprocating movement of piston 105 rotates piston 105 by 40° by the action of gears 144, 146 and 148, 150 at least one control passage 116′–116′′′ will be in communication with one of the three measuring lines 117.

The three measuring lines 117′, 117′′ and 117′′′ each lead to a pressure gauge and/or control device 120′ or 120′′ or 120′′′, respectively, which indicate the pressure existing in the interior of chamber 103 in dependence on the circumferential position of piston 105.

Two grooves 154 are formed on the outer surface of wall 152 between the control passages 116′–116′′′. These grooves are arranged to be parallel to the axis of rotation of piston 105. The angular spacing between control passages 116′–116′′′ and the grooves 154 is 40° in each case, so that one control passage is always in communication with one measuring line 117′–117′′′, whereas the other two measuring lines are aligned with a groove 154. In the position shown in FIG. 4, the bore 106 of this embodiment is connected with the pressure gauge and/or control device 120′ via control passage 116′ and measuring line 117′, whereas the other two measuring lines 117′′ and 117′′′ are located opposite respective grooves 154.

The grooves 154 defined in piston wall 152 are each put in communication with a ventilation or discharge opening 156, which passes through the wall 102 of cylinder 101, as soon as piston 105 has reached its end position, which in FIG. 3 is the upper position. The ventilation openings 156, whose arrangement in wall 102 of cylinder 101 is shown in dashed lines in FIG. 4, open into the atmosphere.

The measuring lines 117′–117′′′ defined in wall 102 of cylinder 101 on the one hand, and the discharge openings 156 for grooves 154 on the other hand, are disposed in different planes, as can be seen in the embodiment showing control line 117′ and the one discharge opening 156 in FIG. 3. The distance of these two planes from each other corresponds to the length of the grooves 154.

As can also be seen from the drawings, two reversing channels 111, 112 are provided in the wall 102 of cylinder 101 and contain suitable, known check valves 113 or 114, respectively. As can be seen in FIG. 4, the channels 111, 112 are arranged next to each other on one side of cylinder 101 in order to simplify fabrication.

During operation of the device the member 114 is connected with one of the measuring points, which may be provided in a pressure-tight manner, for example, at the housing of a revolving piston engine, by suitable lines (not shown). The pressure existing at the measuring point—in the case of a revolving piston engine, the compression pressure of the combustion chambers passing by the measuring point—passes through bore 118 into the bore 106 of piston 105 which is open toward bore 118. Piston 105 is lifted out of its lower rest position as a result. The subsequent meshing of the teeth of the two upper crown gears 144, 146 simultaneously imparts a rotary movement to the piston 105 as it moves upward. Piston 105 is pressed upwardly until a control passage 116′–116′′′ connected to a measuring line 117′– 117′′′ comes into communication with a measuring line 117. Then the medium under pressure, such as combustion gases may flow from the bore 106 through the respective control passage and measuring line to the connected pressure gauge and/or control device 120′–120′′′. The device will then indicate the pressure existing in bore 106 and also in the combustion chamber (not shown).

The two remaining measuring lines—that is, the measuring lines 117′′ and 117′′′ for the piston position shown in FIG. 4—are in communication with grooves 154. Due to this connection, the two pressure gauges and/or control devices 120′′, 120′′′ come into communication with the atmosphere through the discharge openings 156 connected with grooves 154, so that no pressure indication occurs at the respective devices 120′′, 120′′′. This has the advantage that the pressurized combustion gases or the like to be measured cannot escape between the wall 102 of cylinder 101 and wall 152, e.g. from the two "free" control passages—in FIG. 4 passages 116′′ and 116′′′—"free", measuring lines 117′′ and 117′′′′ where they would indicate a measuring result at instruments 120′′ and 120′′′.

Shortly before reaching the upper end position, piston 105 unblocks a lower entry opening 158 of reverse channel 111. This permits the medium to be measured to flow through channel 111, open check valve 113, and flow into the bore 107. Since a pressure equalization has thus been effected via the channel 111 in the bores 107 and 106, piston 105 remains in its upper end position. When the pressure to be measured decreases the check valve 113 provided in bore 107 immediately closes, so that the pressure in bore 107 remains constant whereas the pressure in bore 106 is reduced. The pressure difference then causes piston 105 to go downward again. In the last phase of the downward movement of piston 105, the crown gears 148 and 150 come into engagement, so that the piston 105 is again rotated by 20°. Shortly before reaching the lower end or rest position, one of the bores 115 disposed in the area of the bore 107 in piston wall 152 coincides with entry opening 160 of channel 112, so that the pressure medium existing in the bore 107 and in the upper region of the cavity 103, through which the piston 105 is moved downwardly, flows out through channel 112 after opening check valve 114.

With each increase and decrease in pressure, piston 105 is lifted and lowered in cylinder 101 in the manner just described. With each up and down movement of piston 105, the piston 105 is rotated by an angle of 40°, as already mentioned, so that one of the measuring lines 117′–117′′′ is always in communication with one control passage 116′–116′′′ defined in piston 105. The other two control passages 116′–116′′′ are connected with the atmosphere during this time through grooves 154 and the corresponding exit openings 156, so that a pressure indication is prevented at the "free" instruments.

Instead of a plurality of measuring or control devices, it is also possible to employ a single instrument (not shown) which can be switched in a known manner (not shown) to the individual measuring lines 117′–117′′′.

The measuring lines 117′–117′′′ may be provided with suitable, known check valves 121 (FIG. 3). The check valves 21 and 121 ensure that a medium flows only in one direction in the conduits containing such valves.

It will be understood that the above description of the present invention is susceptible to various modifications, changes and adaptations, and the same are intended to be comprehended within the meaning and range of equivalents of the appended claims.

I claim:

1. Apparatus for measuring and controlling pressures appearing in succession at the same measuring point, comprising, in combination:
   a. a cylinder defining a chamber and arranged at a measuring point;
   b. a piston defining a plurality of control passages and arranged in said chamber for movement by successive pressures appearing at the measuring point;
   c. a plurality of measuring lines each associated with a respective one of the successive pressures and communicating with said chamber; and
   d. means for imparting a control movement to said piston by means of the successive pressures and for consecutively connecting said measuring lines to the measuring point through at least one of said plurality of control passages.

2. An apparatus as defined in claim 1, wherein the movement of said piston in said cylinder is a reciprocating movement between a starting position and an end position and said piston defines a circumferential guide groove, and further including guide pin means for cooperating with said guide groove for forming said control movement imparting means and imparting a rotary control movement to said piston during its reciprocating movement.

3. An apparatus as defined in claim 2, wherein said guide pin means is a resiliently mounted guide pin, and wherein said guide groove has a zigzag shape with steplike portions at the reversal points to permit rotation of said piston only in one direction.

4. An apparatus as defined in claim 3, wherein said piston defines mass-reducing bores.

5. An apparatus as defined in claim 4, wherein said cylinder has a wall, and further including a pair of reversing channels defined in said wall and arranged to return said piston to its starting position from its end position.

6. An apparatus as defined in claim 4, further including spring means for biasing said piston and returning it to its starting position from its end position.

7. An apparatus as defined in claim 4, further including at least one check valve arranged in a respective one of each of said measuring lines.

8. An apparatus as defined in claim 1, wherein said piston has a pair of opposed ends, and wherein said control movement imparting means has a gear mounted on each of said pair of ends and a gear mounted on each end of said cylinder and arranged to alternatingly mesh with a respective one of said gears mounted on said piston, such that said piston is imparted a rotary movement in addition to, and depending on, its reciprocating movement.

9. An apparatus as defined in claim 8, wherein said gears are crown gears.

10. An apparatus as defined in claim 9, wherein said piston is rotated 40° during one reciprocating movement.

11. An apparatus as defined in claim 10, wherein said piston has a wall, and said control passages are defined in said wall and are circumferentially spaced from one another at an angel of 120°.

12. An apparatus as defined in claim 11, wherein said piston wall defines a pair of grooves uniformly spaced between a pair of adjacent ones of said control passages and wherein said cylinder wall defines ventilation openings communicating with respective ones of said pairs of grooves.

* * * * *